(12) United States Patent
Seyfi et al.

(10) Patent No.: US 10,798,344 B1
(45) Date of Patent: Oct. 6, 2020

(54) ASSET MANAGEMENT MONITORING

(71) Applicant: Alarm.com Incorporated, Tysons, VA (US)

(72) Inventors: Ahmad Seyfi, Tysons, VA (US); Babak Rezvani, Tysons, VA (US)

(73) Assignee: Alarm.com Incorporated, Tysons, VA (US)

(*) Notice: Subject to any disclaimer, the term of this patent is extended or adjusted under 35 U.S.C. 154(b) by 0 days.

(21) Appl. No.: 16/798,854

(22) Filed: Feb. 24, 2020

Related U.S. Application Data

(63) Continuation of application No. 15/888,406, filed on Feb. 5, 2018, now Pat. No. 10,574,945.

(60) Provisional application No. 62/454,144, filed on Feb. 3, 2017.

(51) Int. Cl.
G05D 1/00 (2006.01)
H04N 7/18 (2006.01)
G05D 1/02 (2020.01)
G06K 9/00 (2006.01)
B64C 39/02 (2006.01)
G06F 16/58 (2019.01)

(52) U.S. Cl.
CPC .......... *H04N 7/185* (2013.01); *B64C 39/024* (2013.01); *G05D 1/0088* (2013.01); *G05D 1/0202* (2013.01); *G06F 16/5866* (2019.01); *G06K 9/0063* (2013.01); *G06K 9/00771* (2013.01); *B64C 2201/127* (2013.01)

(58) Field of Classification Search
CPC ........ B64C 2201/123; B64C 2201/127; G05D 1/0088; G05D 1/02

USPC .......................................................... 348/144
See application file for complete search history.

(56) References Cited

U.S. PATENT DOCUMENTS

| | | | |
|---|---|---|---|
| 2014/0277854 A1* | 9/2014 | Jones | G06Q 30/0261 701/3 |
| 2014/0316614 A1 | 10/2014 | Newman | |
| 2015/0339912 A1 | 11/2015 | Farrand et al. | |
| 2016/0266577 A1 | 9/2016 | Kerzner | |
| 2017/0069214 A1 | 3/2017 | Dupray et al. | |
| 2017/0092109 A1 | 3/2017 | Trundle et al. | |

(Continued)

FOREIGN PATENT DOCUMENTS

| | | |
|---|---|---|
| CN | 103812052 B | 6/2016 |
| JP | 2017135550 A | 8/2017 |

(Continued)

*Primary Examiner* — Jeffery A Williams
(74) *Attorney, Agent, or Firm* — Fish & Richardson P.C.

(57) ABSTRACT

Techniques are described for an autonomous asset management system that integrates autonomous devices, such as drone devices and other robotic devices, with a home security system of a property to enable management, monitoring, and/or tracking of various assets located within the property. In some implementations, an indication of an asset associated with a property is obtained by an autonomous device. Sensor data collected by one or more sensors of the property is obtained by the autonomous device based on the indication of the asset. A present status of the asset is determined by the autonomous device based on the sensor data. A determination that the present status of the asset does not correspond to an expected status of the asset is made by the autonomous device. In response, the autonomous device navigates to the particular location of the property.

20 Claims, 6 Drawing Sheets

(56) References Cited

U.S. PATENT DOCUMENTS

| | | |
|---|---|---|
| 2017/0185849 A1 | 6/2017 | High et al. |
| 2017/0203840 A1 | 7/2017 | Myslinski |
| 2017/0205827 A1 | 7/2017 | Rezvani |
| 2017/0293301 A1 | 10/2017 | Myslinski |
| 2017/0345282 A1 | 11/2017 | Farrell et al. |

FOREIGN PATENT DOCUMENTS

| | | |
|---|---|---|
| KR | 20170070713 A | 6/2017 |
| KR | 101827249 B1 | 2/2018 |

\* cited by examiner

300

```
┌─────────────────────────────────────────────────────────────────────┐
│  OBTAIN DATA INDICATING A DYNAMIC MULTI-DIMENSIONAL SPATIAL         │
│              REPRESENTATION OF A PROPERTY                      310  │
└─────────────────────────────────────────────────────────────────────┘
                                  ↓
┌─────────────────────────────────────────────────────────────────────┐
│           DETERMINE A PRESENT STATUS FOR AN ASSET              320  │
└─────────────────────────────────────────────────────────────────────┘
                                  ↓
┌─────────────────────────────────────────────────────────────────────┐
│   DETERMINE THAT THE PRESENT STATUS FOR THE ASSET DOES NOT          │
│       COINCIDE WITH AN EXPECTED STATUS FOR THE ASSET           330  │
└─────────────────────────────────────────────────────────────────────┘
                                  ↓
┌─────────────────────────────────────────────────────────────────────┐
│  PERFORM A PARTICULAR ACTION BASED ON DETERMINING THAT THE          │
│  PRESENT STATUS DOES NOT COINCIDE WITH THE EXPECTED STATUS FOR      │
│                         THE ASSET                              340  │
└─────────────────────────────────────────────────────────────────────┘
```

```
┌─────────────────────────────────────────────────────────────┐
│ OBTAIN AN INDICATION OF AN ASSET ASSOCIATED WITH A PROPERTY │
│ AND IS TO BE MONITORED BY A DRONE DEVICE                    │
│                                                         610 │
└─────────────────────────────────────────────────────────────┘
                              │
                              ▼
┌─────────────────────────────────────────────────────────────┐
│ OBTAIN SENSOR DATA COLLECTED BY ONE OR MORE SENSORS OF THE  │
│ PROPERTY                                                    │
│                                                         620 │
└─────────────────────────────────────────────────────────────┘
                              │
                              ▼
┌─────────────────────────────────────────────────────────────┐
│ DETERMINE A PRESENT STATUS OF THE ASSET                     │
│                                                         630 │
└─────────────────────────────────────────────────────────────┘
                              │
                              ▼
┌─────────────────────────────────────────────────────────────┐
│ DETERMINE THAT THE PRESENT STATUS OF THE ASSET DOES NOT     │
│ CORRESPOND TO AN EXPECTED STATUS OF THE ASSET               │
│                                                         640 │
└─────────────────────────────────────────────────────────────┘
                              │
                              ▼
┌─────────────────────────────────────────────────────────────┐
│ NAVIGATE TO A PARTICULAR LOCATION OF THE PROPERTY IN        │
│ RESPONSE TO THE DETERMINATION                               │
│                                                         650 │
└─────────────────────────────────────────────────────────────┘
```

FIG. 6

ASSET MANAGEMENT MONITORING

CROSS-REFERENCE TO RELATED APPLICATIONS

This application is a continuation of U.S. application Ser. No. 15/888,406, filed Feb. 5, 2018, now allowed, which claims the benefit of U.S. Provisional Patent Application No. 62/454,144, filed on Feb. 3, 2017 and titled "ASSET MANAGEMENT MONITORING." Both of these prior applications are incorporated by reference in their entirety.

TECHNICAL FIELD

This disclosure relates to asset monitoring technology.

BACKGROUND

An unmanned aerial vehicle (UAV), or a drone device, refers to an electronic device that is capable of navigating, either under remote control by a human operator, or fully or intermittently autonomously, by onboard computers. Drone devices can be associated with a monitoring system of a property to perform various types of monitoring operations of the property. For example, a camera of a drone device can capture video footage of a property premises while performing a surveillance operation.

SUMMARY

Home security systems often include stationary sensors that are placed in designated locations within a property. For example, a security system may include a security camera placed on a front door, a security camera placed on a back door, and sensors that collect activity at or near certain locations within the property. However, because the components of such security systems are often fixed at a designated location, such security systems are often unable to monitor the entire premises of the property. Fixed components of such security systems also may be unable to track objects of interest that are periodically moved throughout an indoor environment of the property.

Accordingly, techniques are described for an autonomous asset management system that integrates autonomous devices, such as drone devices and other robotic devices, with a home security system of a property to enable management, monitoring, and/or tracking of various assets located within the property. The autonomous devices described herein may be capable of using various environmental mapping and/or pattern matching techniques (e.g., visual and inertial odometry, simultaneous localization and mapping, object recognition and detection, template matching, three-dimensional spatial mapping, etc.) to capture information related to asset management. For example, the autonomous devices may use such techniques to navigate through an indoor environment of the property and periodically monitor states associated the assets located within the property.

In some implementations, an autonomous device may generate and use a dynamic multi-dimensional spatial representation of an indoor environment of property to improve both autonomous navigation and asset tracking within the indoor environment. For instance, the autonomous device may initially perform a registration scan of the property to generate a three-dimension spatial map of the indoor environment. The autonomous device may then obtain sensor data (e.g., on-board sensor data or data obtained from external sensors within the property) to identify locations of dynamic objects (e.g., doors, windows, etc.) and assets (e.g., personal property of a user) within the indoor environment. The autonomous device may then use the obtained sensor data to generate a multi-dimensional spatial representation of the property.

The autonomous device may periodically monitor the conditions of the property to identify updates to the placement, configuration, location, or structure of both dynamic objects and assets identified within the multi-dimensional spatial representation. For example, the autonomous device may compute a respective status for each dynamic object and/or asset that represents its present condition when the autonomous device surveys the indoor environment of the property. In this regard, the autonomous device may the techniques described herein to both detect status changes for the dynamic objects to improve navigation through the indoor environment of the property, and detect status changes for assets to improve monitoring, tracking, and/or management of the assets.

In one general aspect, a computer-implemented method may include: obtaining, by an autonomous device, data indicating a dynamic multi-dimensional spatial representation of a property, the data identifying (i) one or more assets within the property, and (ii) a respective expected status for each of the one or more assets within the property; determining, by the autonomous device, a present status for at least one of the one or more assets; determining, by the autonomous device, that the present status for the at least one of the one or more assets does not coincide with the expected status for the at least one of the one or more assets; performing, by the autonomous device, a particular action based on determining that the present status for the at least one of the one or more assets does not coincide with the expected status for the at least one of the one or more assets.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 3 illustrates an example of a process for performing a particular action based on detecting a status change for an asset.

FIG. 6 illustrates an example of a process for monitoring the status of an asset.

In the drawings, like reference numbers represent corresponding parts throughout.

DETAILED DESCRIPTION

Figure 1:
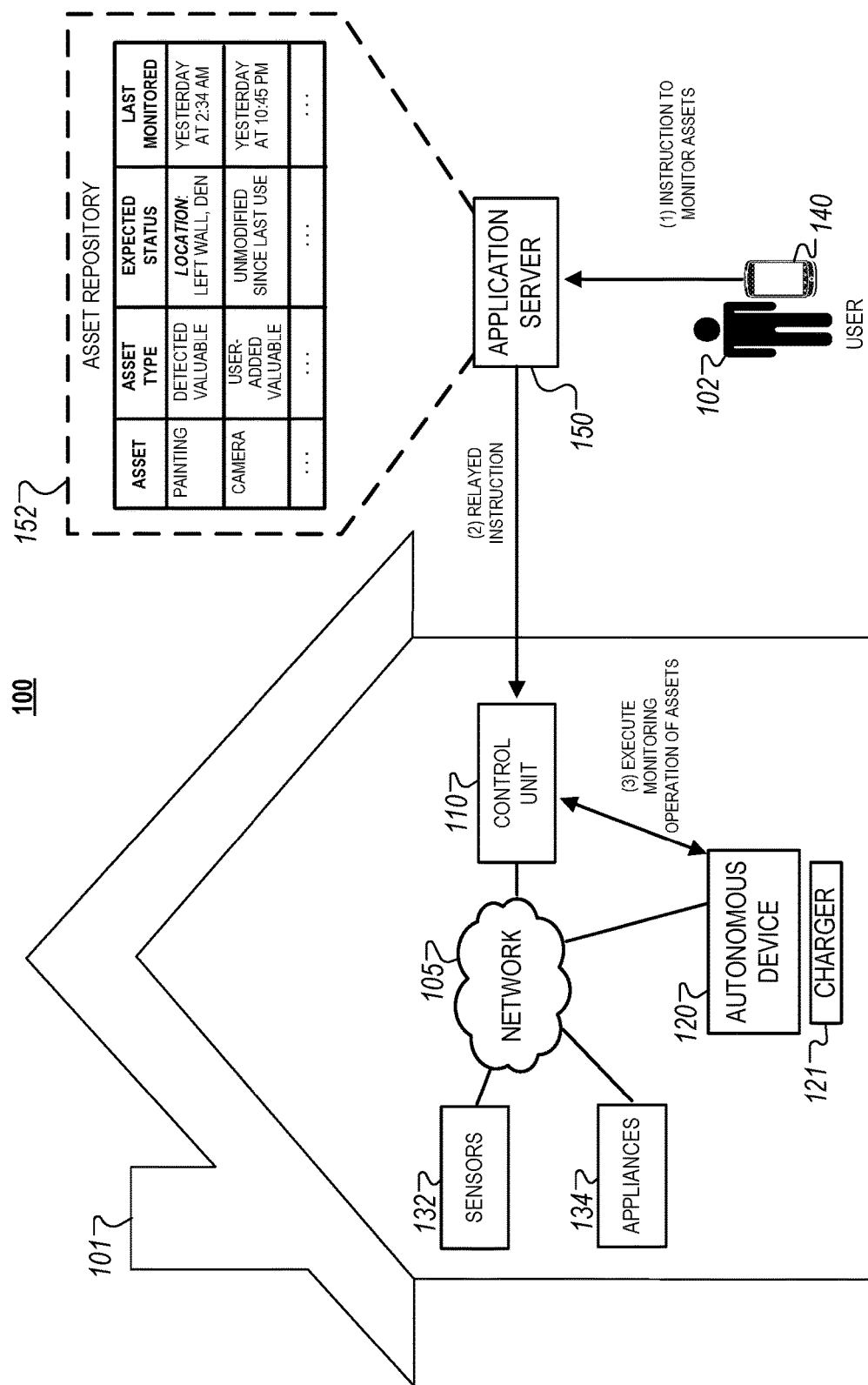
FIG. 1 illustrates an example of a system that is capable of using autonomous asset management techniques.

In general, techniques are described for an autonomous asset management system that integrates autonomous devices, such as drone devices and other robotic devices, with a home security system of a property to enable management, monitoring, and/or tracking of various assets located within the property. The autonomous devices described herein may be capable of using various environmental mapping and/or pattern matching techniques (e.g., visual and inertial odometry, simultaneous localization and mapping, object recognition and detection, template matching, three-dimensional spatial mapping, etc.) to capture information related to asset management. For example, the autonomous devices may use such techniques to navigate through an indoor environment of the property and periodically monitor states associated the assets located within the property.

As described throughout, a "dynamic object" refers to any type of physical object whose placement, configuration, location, or structure can be adjusted over time. In some examples, a dynamic object can represent structural elements associated with a property premises such as a door, window, or sliding wall. In other examples, a dynamic object can represent stationary objects such as furniture whose placement within an indoor environment can be adjusted. In other examples, a dynamic object can represent movable tangible objects.

As described throughout, an "asset" refers to any type of personal property that is placed within a property. In some examples, an asset refers to tangible personal property that is considered valuable to its owner (e.g., a piece of artwork, antiques, jewelry, etc.). In other examples, an asset can refer to objects that a user has designated to be of interest and subject to periodic monitoring.

As described throughout, a "status" of a dynamic object (or "dynamic object status") refers to a present placement, configuration, location, condition, or structure of the dynamic object at any given instance in time. For example, a status of a window can represent whether the window is open or closed, or the degree to which the window is open. In another example, the status of a door can represent whether the door is open or closed, or the degree to which the door is open represented by the angle formed between the edge of the door and the door frame. In yet another example, the status of an appliance such as a ceiling fan can represent if the fan is on or off.

As described in greater detail below, the status of a dynamic object can be used to determine whether the present configuration, location, or structure of the dynamic object presents an impediment to a navigational route of an autonomous device. For example, if a bedroom door is presently closed, then its corresponding present status can be used to indicate that the autonomous device will be unable to access the bedroom through the bedroom door. In another example, if a ceiling fan is currently turned on, then its corresponding present status can be used to indicate that the surrounding region is an obstruction to the autonomous device.

In some implementations, present status information of dynamic objects can be used to provide granular information related to the ability of the autonomous device to navigate through the indoor environment of a property. For instance, status information indicating a degree to which a window or door is presently open can be used to determine if an autonomous device can navigate through a space associated with the opening. In one example, if the status indicates that a window is 60% open, then the spacing may be large enough to enable an autonomous device to pass through the space. Alternatively, if the status indicates that the window is 30% open, then the status may instead be used to determine that the autonomous device cannot pass through the opening even through sensor information indicates that the window is "open."

As described throughout, a "status" of an asset (or "asset status") refers to a present placement, configuration, location, condition, or structure of the asset at any given instance in time. For example, a status of a painting can represent whether the painting is currently located in an authorized location of the property (e.g., a location that is verified by the user), the orientation of the painting on a wall, a physical condition of the painting, or a combination of such types of information. In another example, a status of an asset that is moved throughout the property according to a specified schedule (e.g., a car parked in a garage) can represent whether the asset is located in a designated location based on the specified schedule. In other examples, a status of an asset can indicate whether an asset has been modified and/or adjusted without permission by its owner.

As described in greater detail below, the status of an asset can be used to determine if the asset has been changed, moved, or otherwise removed from the property without permission/authorization from the user. For example, if a location of an asset that is being monitored has changed, then its corresponding present status can be used to indicate its updated located within the property. In this example, location tracking of an asset using its status can be used to determine if the asset has been moved within the property and/or removed from the property without the user's permission. In another example, the asset status can be used to detect if the asset has been changed, moved, or otherwise removed without the user's permission. In this example, the asset status can represent a timestamp associated with when the asset has been changed, moved, or otherwise removed.

In some implementations, present status information of an asset can be used to determine if the asset has been changed, moved, or otherwise removed without the permission of the user. For instance, the present status can be compared against an expected status defined based on, for example, a prior monitoring operation or a set of configuration options specified by the user, to determine if an asset has been used, changed, or removed over the time period since the asset was last monitored. For example, an expected status can specify a location where the user placed a valuable object, and a present status indicating that the valuable object is not presently located in that location can be used to determine that the object was either moved to another location within, or removed from, the property without the user's permission.

As described throughout, a "user" refers to an individual that has sufficient authority to access a property and transmit instructions to configure and/or adjust monitoring operations associated with the property. In some examples, the user presently occupies a property when the autonomous device performs the dynamic navigation techniques described throughout. In such examples, the user may transmit instructions to the autonomous device directly (e.g., through a voice query) or over a local network within the property. In other examples, the user is remote from the property when the autonomous device performs the dynamic navigation techniques. In such examples, the user may use a webpage and/or a mobile application to transmit instructions to the autonomous device through an associated application server that is configured to monitor communications with devices of a monitoring system over a wide area network.

FIG. 1 illustrates an example of an electronic system 100 that is capable of using autonomous asset management techniques. The electronic system 100 includes a control unit 110, an autonomous device 120, sensors 132, appliances 134, a user device 140, and an application server 150 connected over a network 105 within a property 101. The user device 140 can be associated with a user 102 such as an individual that is authorized to access the property 101 and/or control monitoring operations of the system 100. The application server 150 further includes an asset repository 152 for storing information associated with assets that are located within the property 101. The asset repository 152 may additionally or alternatively stored locally on the control unit 110 and/or the user device 140.

In general, the system 100 enables the user 102 to configure and adjust various types of monitoring operations that are associated with the property 101. As examples, the user 102 can use the system 100 to view and collect security footage captured by the sensors 132, track detected movement through the property premises, adjust a set point temperature for a connected thermostat, and/or enable or disable the operation of the appliances 134.

The user 102 can also use the system 100 to locally or remotely transmit instructions to the autonomous device 120 to perform a specified action. For example, the user 102 may use the system 100 to transmit an instruction to the autonomous device 120 to perform a surveillance operation of the premises of the property 101. In other examples, the user 102 may use the system 100 to monitor, track, and manage assets that are located within the property 101. In such examples, the autonomous device 120 may periodically navigate through the indoor environment of the property 101 and check the status of assets located within the property 101. As described in greater detail below, the autonomous device 120 may also perform specified actions in response to detecting status changes of assets indicating security breaches and/or other problematic conditions.

When the user 102 is remote from the property 101, as depicted in FIG. 1, the user 102 may use a mobile application on the user device 140 to remotely transmit instructions to perform specified actions. In some implementations, the instructions are transmitted to the application server 150, and then relayed to local devices such as the autonomous device 120 through the control unit 110. In other implementations, the autonomous device 120 may also be capable of directly exchanging communications with the application server 150. Although the system 100 can be used to perform general purpose monitoring operations, as described above, the descriptions herein are directed to the use of instructions to control and adjust the operation of the autonomous device 120 for brevity.

Referring now to the components of system 100, the network 105 is configured to enable exchange of electronic communications between devices connected to the network 105. For example, the network 105 may be configured to enable exchange of electronic communications between the control unit 110, the autonomous device 120, the sensors 132, the appliances 134, the user device 140, and the application server 150.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway.

The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The control unit 110 includes a controller and a network module. The controller is configured to control a monitoring system (e.g., a home alarm or security system) that includes the autonomous device 120. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the autonomous device 120.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the autonomous device 120 to communicate over a local area network and/or the Internet. The network module also may be a voice band modem configured to enable the alarm panel to communicate over the telephone lines of Plain Old Telephone Systems (POTS).

The control unit 110 may store sensor and image data received from the system 100 and perform analysis of sensor and image data received from the system 100. Based on the analysis, the control unit 110 may communicate with, and control aspects of, the autonomous device 120, the sensors 132, the appliances 134, or the user device 140. In addition, the control unit 110 may store dynamic object data (e.g., based on sensor data collected by the sensors 132), or information associated with dynamic object data (e.g., historical status information associated with dynamic objects). The control unit 110 may also store data associated with the dynamic multi-dimensional spatial representations that are determined for the property 101. For example, the control unit 110 may store historical data associated with previously generated spatial representations of the property 101 over a specified period of time.

The autonomous device 120 may be any type of electronic device that is capable of moving and taking actions that assist in security monitoring. For example, the autonomous device 120 may be an unmanned device (e.g., a drone device), a robotic device, or any other type of device that is capable of moving throughout the property 101 based on automated control technology and/or user input control provided by a user. In some examples, the autonomous device 120 may be able to fly, roll, walk, or otherwise move about the property 101.

In various implementations, the autonomous device 120 may be a helicopter type device (e.g., a quad copter), a rolling helicopter type device (e.g., a roller copter device that can fly and also roll along the grounds, walls, or ceiling), a land vehicle type device (e.g., automated cars that drive around a property), or a plane type device (e.g., unmanned aircraft). In some instances, the autonomous device 120 may be a robotic device that is intended for other purposes and associated with the system 100 for use in appropriate circumstances. For instance, a security drone may be associated with the system 100 as the autonomous device 120 and may be controlled to take action responsive to system events.

The autonomous device 120 can be configured to automatically navigate within the property 101. For instance, the autonomous device 120 may include sensors and control processors that guide movement of the autonomous device 120 within the property. The autonomous device 120 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The autonomous device 120 may include control processors that process output from the various sensors and control the autonomous device 120 to move along a navigational route that reaches the desired destination and avoids obstacles. In this regard, the control processors detect walls or other obstacles in the property and guide movement of the autonomous device 120 in a manner that avoids the walls and other obstacles.

In addition, the autonomous device 120 may store data that describes attributes of the property 101. For instance, the autonomous device 120 may store a floorplan and/or a three-dimensional model of the property 101 that enables the autonomous device 120 to navigate the property 101. During initial configuration, the autonomous device 120 may receive the data describing attributes of the property 101, determine a frame of reference to the data (e.g., a home or reference location in the property 101), and navigate the property 101 based on the frame of reference and the data describing attributes of the property 101.

Further, initial configuration of the autonomous device 120 also may include learning of one or more navigation patterns in which a user or a system administrator provides input to control the autonomous device 120 to perform a specific navigation action (e.g., fly to an upstairs bedroom and spin around while capturing video and then return to a home charging base). In this regard, the autonomous device 120 may learn and store the navigation patterns such that the autonomous device 120 may automatically repeat the specific navigation actions when instructed to assist a user during a detected emergency condition at the property.

In some implementations, the autonomous device 120 may include data capture and recording devices. In these examples, the autonomous device 120 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property.

In some implementations, the autonomous device 120 may include output devices. In these implementations, the autonomous device 120 may include one or more displays, one or more speakers, one or more projectors, and/or any type of output devices that allow the autonomous device 120 to communicate information to a nearby user. The one or more projectors may include projectors that project a two-dimensional image onto a surface (e.g., wall, floor, or ceiling) and/or holographic projectors that project three-dimensional holograms into a nearby space.

The autonomous device 120 also may include a communication module that enables the autonomous device 120 to communicate other devices of the system 100. The communication module may be a wireless communication module that allows the autonomous device 120 to communicate wirelessly. For instance, the communication module may be a Wi-Fi module that enables the autonomous device 120 to communicate over a local wireless network at the property. The communication module further may be a 900 MHz wireless communication module that enables the autonomous device 120 to communicate directly with the control unit 110. Other types of short-range wireless communication protocols, such as Bluetooth, Bluetooth LE, Z-wave, ZigBee, etc., may be used to allow the autonomous device 120 to communicate with other devices in the property. The communication module may also communicate with components of the system 100 (e.g., the control unit 110, the sensors 132, the appliances 134, or the user device 140) to perform specified actions such as opening a door, changing a set point temperature within the property 101, among others. For example, a communication module may transmit a signal transmission to one or more of the components with instructions to perform a specified action.

The autonomous device 120 further may include processing and storage capabilities. The autonomous device 120 may include any suitable processing devices that enable the autonomous device 120 to operate applications and perform the actions described throughout this disclosure. In addition, the autonomous device 120 may include solid state electronic storage that enables the autonomous device 120 to store applications, configuration data, collected sensor data, and/or any other type of information available to the autonomous device 120.

The autonomous device 120 may be associated with a charging station 121. The charging station 121 may be located at a predefined or reference location within a property. The autonomous device 120 may be configured to navigate to the charging station 121 after successfully performing a particular specified action. For instance, after completing the specified action upon instruction by the control unit 110, the autonomous device 120 may be configured to automatically fly to and land on one of the charging station 121. In this regard, the autonomous device 120 may automatically maintain a fully charged battery in a state in which the autonomous device 120 are ready for use by the system 100.

The charging station 121 may be a contact-based charging stations and/or wireless charging stations. For contact based charging stations, the autonomous device 120 may have readily accessible points of contact that the autonomous device 120 are capable of positioning and mating with a corresponding contact on the charging station 121. For instance, a helicopter type robotic device may have an electronic contact on a portion of its landing gear that rests on and mates with an electronic pad of a charging station 121 when the helicopter type robotic device lands on the charging station 121. The electronic contact on the robotic device may include a cover that opens to expose the electronic contact when the robotic device is charging and closes to cover and insulate the electronic contact when the robotic device is in operation.

For wireless charging stations, the autonomous device 120 may charge through a wireless exchange of power. In these cases, the autonomous device 120 need only locate themselves closely enough to the wireless charging stations for the wireless exchange of power to occur. In this regard, the positioning needed to land at a predefined home base or reference location in the property may be less precise than with a contact-based charging station. Based on the autonomous device 120 landing at a wireless charging station, the wireless charging station outputs a wireless signal that the autonomous device 120 receive and convert to a power signal that charges a battery maintained on the autonomous device 120.

As described above, the autonomous device 120 may exchange communications with the control unit 110, the sensors 132, the appliances 134, the user device 140, and the application server 150 over the network 105 or any other suitable communication means. For example, the autonomous device 120 may utilize a wireless data pathway configured to transmit signals from the control unit 110, the sensors 132, the appliances 134, the user device 140, and the application server 150 to a controller. The control unit 110, the sensors 132, the appliances 134, the user device 140, and the application server 150 may continuously transmit sensed values to the controller, periodically transmit sensed values to the autonomous device 120, or transmit sensed values to the autonomous device 120 in response to a change in a sensed value.

In some implementations, the autonomous device 120 may additionally be used to perform routine surveillance operations on a property. For instance, the autonomous device 120 may be assigned to one or more particular properties within a geographic location and may routinely collect surveillance footage during specified time periods (e.g., after dark), which may then be transmitted to the application server 150 for transmitting back to each particular property owner. In such implementations, the property owner may receive the surveillance footage over the network 105 as a part of a service provided by a security provider that operates the application server 150. For example, transmissions of the surveillance footage collected by the autonomous device 120 may be part of a premium security service package provided by a security provider in addition to the routine drone emergency response service.

In some implementations, the autonomous device 120 may monitor the operation of the control unit 110, the sensors 132, the appliances 134, the user device 140, and/or the application server 150. For instance, the autonomous device 120 may enable or disable the devices located within a property based on a set of rules associated with energy consumption, user-specified settings, and/or other information associated with conditions prior to, during, or after performing a particular action.

In some implementations, the autonomous device 120 may be used as a replacement to a traditional security panel (e.g., the control unit 110) that is used to monitor and control the operations of the system 100. In other examples, the autonomous device 120 may coordinate monitoring operations with a separate security panel of the system 100. In such examples, the autonomous device 120 may monitor particular activities of the devices of the system 100 that are not monitored by the security panel, or monitor the operation of particular devices that are not monitoring by the security panel.

In some implementations, the autonomous device 120 is configured and managed by a service provider entity associated with the application server 150. In such implementations, the autonomous device 120 may be provided as device component of the system 100 when the sensors 132 and/or the control unit 110 is installed within a property. Alternatively, in other implementations, the autonomous device 120 may be an after-market device that is configured to exchange data communications with components of the system 100 (e.g., the control unit 110, the sensors 132, and/or the appliances 134) when the system 100 is already installed within the property. In this regard, the autonomous device 120 may be a device from the system 100 this is configured to perform the operations described throughout.

In addition, the autonomous device 120 may function to replace and/or supplement the monitoring operations performed by the sensors 132. For instance, in some implementations, the on-board sensors of the autonomous device 120 may perform the substantially same monitoring operations as individual sensors placed within the property 101 (e.g., detecting motion within the property 101, monitoring ambient temperature, adjusting the operations of one or more of the appliances 134, among others). In other implementations, the autonomous device 120 may also complement the monitoring operations of the sensors 132. For example, in response to the system 100 detecting an alarm condition at the property 101, the autonomous device 120 may be deployed to an associated location to verify whether the validity of the alarm condition.

Figure 5:
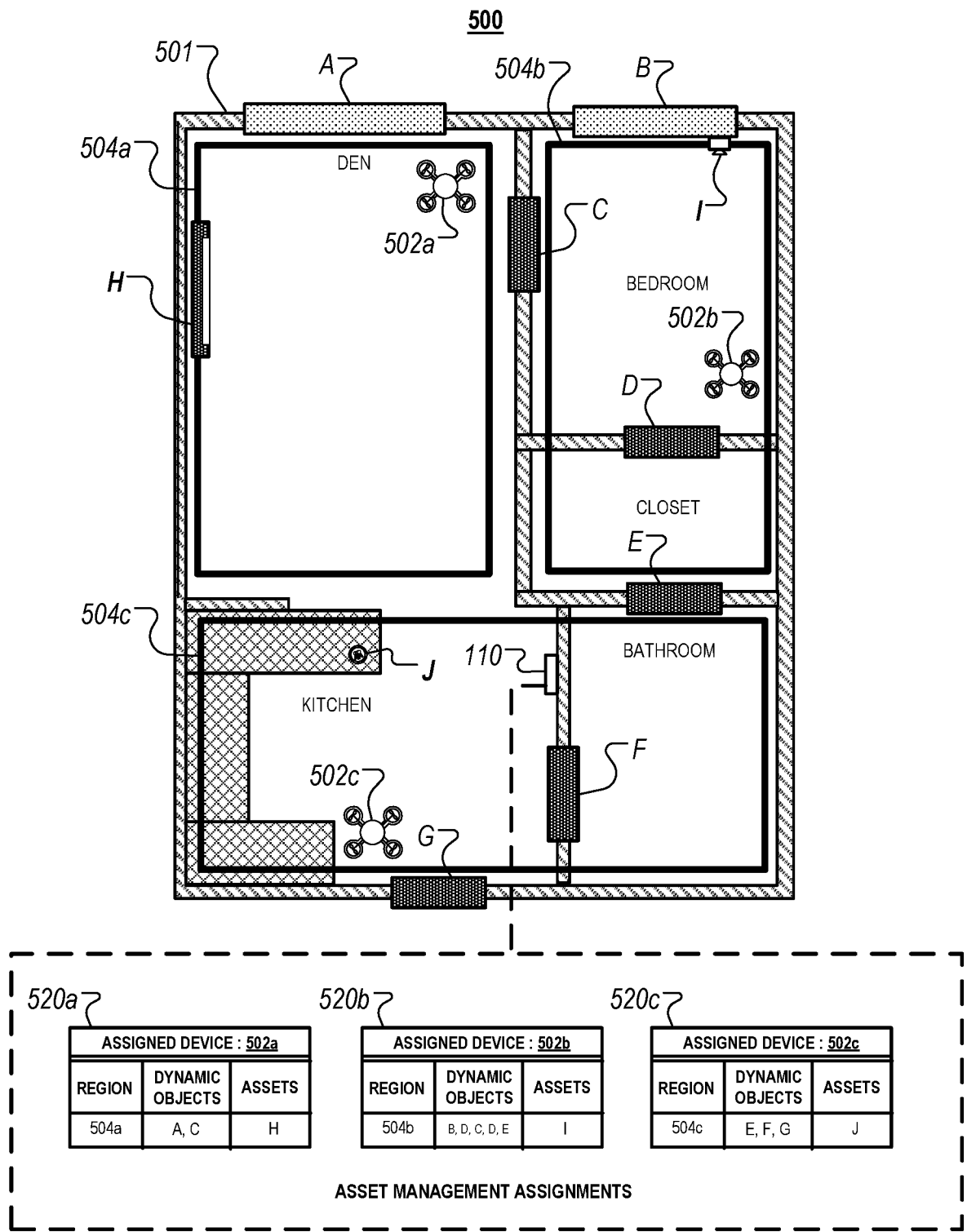
FIG. 5 illustrates an example of a system that includes multiple autonomous devices for performing asset management techniques.

In some implementations, the system 100 may include multiple autonomous devices that exchange communications with one another to perform the monitoring operations described throughout. For example, as illustrated in FIG. 5, a particular autonomous device may be designated to monitor a specified region of the property 101. Each autonomous device may then transmit collected data for each designated region to, for example, the control unit 110 and/or the application server 150, which then aggregates the collected data from each autonomous device. In such implementations, the multiple autonomous devices may operate as a distributed drone network to monitor region-specific property information.

The system 100 may include one or more sensors or detectors. For example, the system 100 may include multiple sensors 132. The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

In some implementations, the sensors 132 may include one or more cameras. The cameras may be video/photographic cameras or other type of optical sensing devices configured to capture images. For instance, the cameras may be configured to capture images of an area within a building monitored by the control unit 110. The cameras may be configured to capture single, static images of the area and also video images of the area in which multiple images of the area are captured at a relatively high frequency (e.g., thirty images per second). The cameras may be controlled based on commands received from the control unit 110.

The appliances 134 may be home automation devices connected to the network 105 that are configured to exchange electronic communications with other devices of the system 100. The appliances 134 may include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the control unit 110 such that the control unit 110 can automatically control the operation of the appliances 134 based on the exchanged communications. For example, the control unit 110 may operate one or more of the appliances 134 based on a fixed schedule specified by the user. In another example, the control unit 110 may enable or disable one or more of the appliances 134 based on received sensor data from the sensors 132.

In some implementations, the configuration and/or operation of the appliances may 132 may be wirelessly controlled by the autonomous device 120. For instance, the communication module of the autonomous device 120 may transmit control signals to configure and/or adjust the operations of one or more of the control unit 110, the sensors 132, the appliances 134, or the user device 140. For example, while traveling along a navigational route within the indoor environment of the property 101, the autonomous device 130 may transmit signals to adjust the status of dynamic objects such as doors or windows, in order to enhance the navigational capabilities of the autonomous device 120.

The user device 140 may be any type of personal electronic computing device that is associated with users that reside within the property 101 (e.g., a tenant, temporary visitor, guest, etc.). The user device 140 may be one or more of a cellular telephone, smartphone, a tablet-computing device, a laptop computing device, a desktop computing device, a wearable device, or any other type of network-enabled electronic device.

The user device 140 may include a native application that enables communications with devices located within the property 101 through the application server 150. The native application refers to software/firmware programs running on the user device 140 that enable various features. For instance, the user device 140 may load or install the native application based on data received over a network 105 or data received from local media. The native application may run on various mobile device platforms associated with the user device 140.

In some implementations, the native application of the user device 140 identifies a geographic location associated with the user device 140 and communicates information identifying the geographic location. For example, the user device 140 having the native application may determine a geographic location of the user device 140 using GPS capabilities, and may communicate data identifying the geographic location to the application server 150. In some instances, the native application may check the location of the user device 140 periodically and may detect when a user is presently located inside or outside a property. The autonomous device 120 to determine the region of the property where the user is located within the property can then use location data associated with the user device 140.

Additionally, or alternatively, the user device 140 may communicate with the control unit 110 and/or the autonomous device 120 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The application server 150 may be an electronic device configured to provide monitoring services by exchanging electronic communications with the control unit 110, the autonomous device 120, the sensors 132, the appliances 134, and the user device 140 over the network 105.

The application server 150 may be configured to monitor events (e.g., alarm events, emergency conditions, etc.) generated by the control unit 110 and/or the autonomous device 120. For example, the application server 150 may exchange electronic communications with the network module included in the control unit 110 to receive information regarding events (e.g., fire, carbon monoxide) detected by the control unit 110. The application server 150 also may receive information regarding events (e.g., alarm events) from the autonomous device 120.

The application server 150 may store sensor and image data received from the system 100 and perform analysis of sensor and image data received from the system 100. Based on the analysis, the application server 150 may communicate with and control aspects of the control unit 110, the autonomous device 120, or the user device 140. In addition, the application server 150 may store dynamic object data (e.g., based on sensor data collected by the sensors 132), or information associated with dynamic object data (e.g., historical status information associated with dynamic objects). The application server 150 may also store data associated with the dynamic multi-dimensional spatial representations that are determined for the property 101. For example, the application server 150 may store historical data associated with previously generated spatial representations of the property 101 over a specified period of time.

The application server 150 may include an asset repository 152 that stores information associated with assets that are automatically identified by the autonomous device 120 within the property 101 and/or manually identified by the user 102 using, for example, a mobile application on the user device 140. For instance, once an asset is identified within the property 101, the autonomous device 120 may various types of information associated with the asset, which is then transmitted for storage in the asset repository 152.

In the example depicted, the asset repository 152 includes fields such as "ASSET," "ASSET TYPE," "EXPECTED STATUS," and "LAST MONITORED." In other implementations, other fields may also be included in the asset repository 152. The information included within the asset repository 152 indicates how an asset has been identified (e.g., as a detected valuable, or a user-added valuable). The asset repository 152 also indicates an expected status that represents a verified placement, configuration, location, or structure for the asset based on user input provided by the user 102. For example, the expected status for a painting is the location where the user 102 has placed the painting within the property 101. In the other example, the expected status for the camera indicates the preference of the user 102 to monitor whether another individual has used the camera without his/her permission. The asset repository 152 can also identify information related to the monitoring operation performed by the autonomous device 120 (e.g., the last time when a present status for the asset was monitored by the autonomous device 120).

In some implementations, the system 100 may use the dynamic navigation techniques described throughout in order to perform surveillance operations related to assets. In such implementations, an asset can represent any type of movable property that is capable of being monitored by the autonomous device 120. For example, as described above, the asset can be a painting that is affixed to a wall within the property 101. In this example, the status of the asset can be used to ensure that the asset has not been removed from the property 101 and/or remains in a location that has been authorized by the user 102. For instance, the status of the asset can be periodically monitored using the techniques described throughout, and in response to either determining that the dynamic object cannot be located and/or is located in an unauthorized region of the property 101, the system 100 may transmit alert notifications to the control unit 110, the user device 140, and/or the application server 150.

Figure 2:
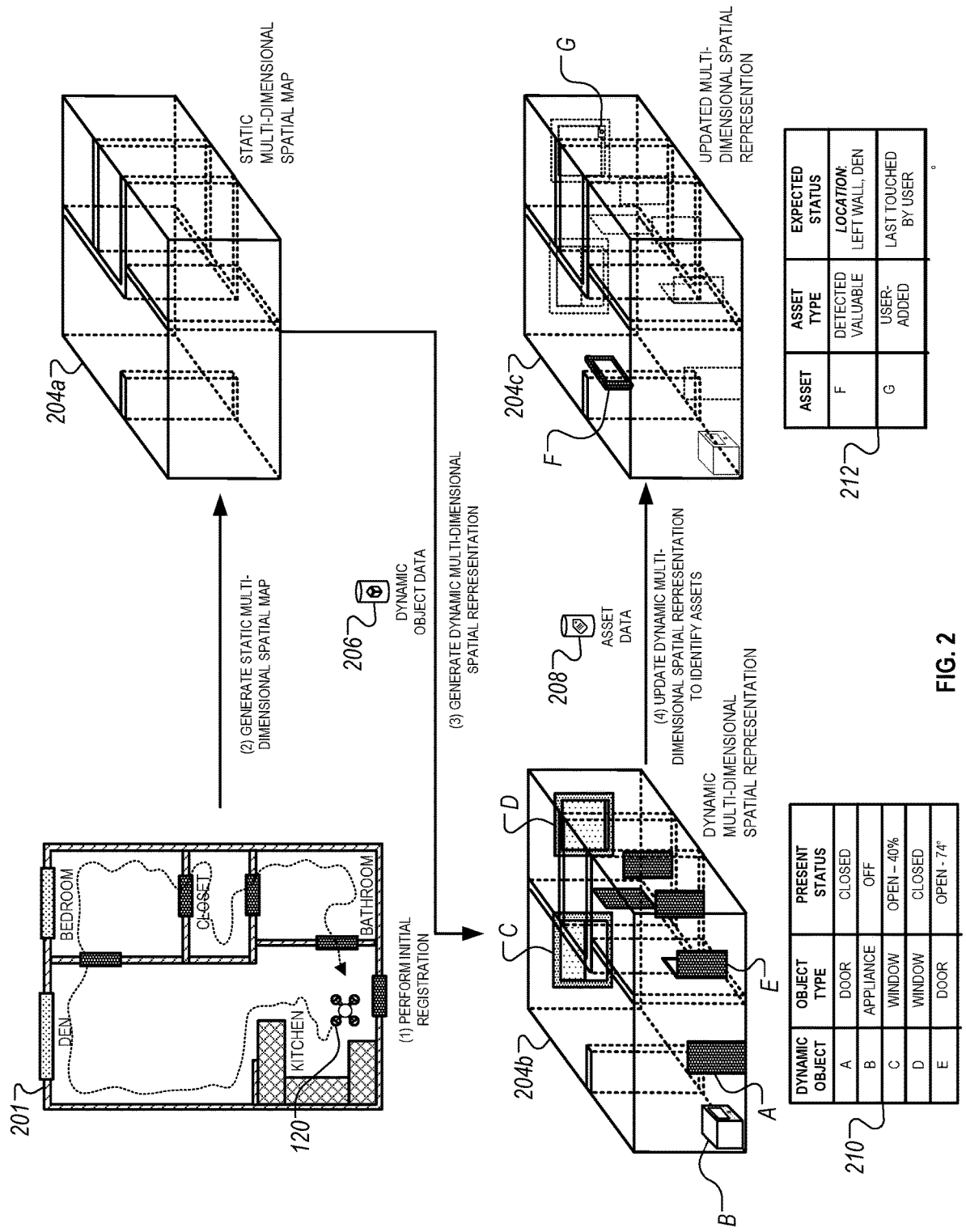
FIG. 2 illustrates an example of a technique for generating a dynamic multi-dimensional spatial representation of a property.

FIG. 2 illustrates an example of a technique for generating a dynamic multi-dimensional spatial representation of a property 201. The spatial representation can be used by the autonomous device 120 to detect changes to the status of a dynamic object and/or asset within an indoor environment of the property 310, navigate through an indoor environment of the property 201, or perform particular actions specified by the user 102 and/or components of the system 100 (e.g., the control unit 110, the application server 150). The autonomous device 120 may use changes to the dynamic object and/or the asset status to, for example, determine the impact of the detected changes to the navigation abilities of the autonomous device 120, determine if a security breach has taken place within the property 201, determine whether to trigger an alarm condition for the property 201, and/or determine if the placement, configuration, location, condition, or structure of one or more of the dynamic objects and/or one or more assets has been changed without permission from an authorized user of the property 201.

In the example illustrated, the autonomous device 120 performs the technique in four steps. At step (1), an initial registration of the property 201 is performed. At step (2), a static multi-dimensional spatial map 204*a* of the property 201 is generated based on performing the initial registration. At step (3), a dynamic multi-dimensional spatial representation 204*b* of the property 201 is generated based on adjusting the static multi-dimensional spatial map 204*a* using dynamic object data 206. At step (4), an updated multi-dimensional spatial representation 204*c* is generated based on adjusting the multi-dimensional spatial representation 203*b* using the asset data 208.

In some implementations, steps (3) and (4) may be performed substantially simultaneously as a part of a single step. For example, in such implementations, the dynamic object data 206 and the asset data 208 may be obtained in a single data transmission (e.g., from the control unit 110, the user device 140, the application server 150, a combination thereof), or in separate data transmissions from one or more components (e.g., a data transmission including the dynamic object data 206 obtained from control unit 110, and another data transmission including the asset data 208 obtained from the application server 150, and vice versa). In addition, in other implementations, steps (3) and (4) may be performed in an alternative order such that the multi-dimensional spatial representation 204*b* is generated adjusting the static multi-dimensional spatial map 204 using the asset data 208 and the updated multi-dimensional spatial representation 204*c* is generated based on adjusting the spatial representation 204*b* using the dynamic object data 206.

Although descriptions below indicate that the illustrated technique is performed by the autonomous device 120, in some implementations, the illustrated technique can additionally or alternatively be performed by one or more other components of the system 100. For example, the illustrated technique may be partially or fully performed by one or more of the control unit 110, the application server 150, and/or another associated server that obtains monitoring data collected by the system 100. In such implementations, the static multi-dimensional spatial map 204*a*, the dynamic multi-dimensional spatial representation 204*b* may be generated by devices that are either local or remote from the autonomous device 120.

In some implementations, the illustrated technique may be partially performed by multiple autonomous devices that coordinate operations amongst one another. For instance, as illustrated in FIG. 5, a property may be segmented into different regions and an individual autonomous device may be assigned with monitoring each region of the property. In such implementations, the multiple autonomous devices may exchange communications with each other and the control unit 110 to reduce the amount of redundant monitoring operations to be performed for the property 201.

Referring to step (1), during an initial registration phase, the autonomous device 120 maps the indoor environment of the property 201. For instance, the autonomous device 120 may navigate through the indoor environment of the property 201 to identify boundaries such as walls, the ceiling, or openings. In some implementations, the autonomous device 120 may perform the initial registration phase using a two-dimensional or three-dimensional floorplan associated with the property 201.

Referring now to step (2), the autonomous device 120 generates the static multi-dimensional spatial map 204*a* based on the data collected during the initial registration phase. For instance, the autonomous device 120 may identify contiguous surfaces that represent walls of the indoor environment and other fixed boundaries such as countertops or ceiling fixtures. The autonomous device 120 may use any suitable three-dimensional mapping technique (e.g., optical detection, infrared detection, etc.) to identify the size and arrangement of regions within the property 201.

In some implementations, the static multi-dimensional spatial map 204*a* may be stored and post-processed after being generated by the autonomous device 120 and/or generated based on data collected by the autonomous device 120. For instance, the static multi-dimensional spatial map 204*a* may be post-processed and/or enhanced to compensate for sensing deficiencies associated with the on-board sensors of the autonomous device 120. The multi-dimensional spatial map 204*a* may be enhanced by allowing an operator or system administrator to manually verify structural features and/or characteristics of the property 201 that have been identified by the autonomous device 120 while performing the initial registration in step (1).

As examples, structural features that are undetected by the autonomous device 120 (e.g., glass panels) or features that have been insufficiently captured by the autonomous device 120 (e.g., low texture surfaces) can be modified, replaced, or spliced into the static multi-dimensional spatial map 204a as enhancements. The enhanced spatial map can then be stored (e.g., at the application server 150) or transmitted to the autonomous device 120. In this regard, the enhanced spatial map can then be used by the autonomous device 120 to avoid any structural features such as glass panels that were not initially detected in the initial registration phase, but added during the post-processing stage.

Referring now to step (3), the autonomous device 120 generates the dynamic multi-dimensional spatial representation 204b based on obtaining and/or collecting dynamic object data 206. The dynamic multi-dimensional spatial representation 204b can either be generated based on adjusting the spatial map 204a (e.g., by inserting virtual graphical overlays onto locations of dynamic objects within the indoor environment of the property 201) or rendering a new spatial map with embedded dynamic object information.

The dynamic object data 206 may indicate a present status associated with dynamic objects that are located within an indoor environment of the property 201. For example, the dynamic object data 206 may identify doors and windows of the property 201 and corresponding locations of each door and window within an indoor environment of the property 201 (e.g., within the static multi-dimensional spatial map 204a).

In some implementations, on-board sensors of the autonomous device 120 can collect the dynamic object data 206. For example, the autonomous device 120 can include a calibrated stereo camera that is capable of estimating the size and location of detected objects during the initial registration stage in step (1). In another example, the autonomous device 120 can also include a three-dimensional volumetric mapping sensor that is capable of determining the distance between the autonomous device 120 and objects that are detected within its field of view. In such implementations, the autonomous device 120 may be capable of using automated object detection and recognition techniques to identify the presence of a dynamic object within its field of view as it performs the initial registration of the property 201. For example, the autonomous device 120 may be capable of utilizing machine learning techniques (e.g., using a recurrent neural network) to automatically identify known dynamic objects such as doors, windows, fixtures, furniture, among others.

Additionally, or alternatively, in some implementations, the dynamic object data 206 is obtained by the autonomous device 120 based on data collected by external sensors within the property 201 such as the sensors 132. For instance, data collected by sensors that are physically placed on dynamic objects such as doors and windows can be obtained in order to enable the autonomous device 120 to infer a present status of the dynamic objects. For example, the autonomous device 120 to determine whether the window is fully closed, fully open, or partially open (and a degree to which the window is partially open) can use a measured height by a sensor that measures a height of a windowsill. In another example, continuous video footage of a back door that is captured by a security camera can be used to determine whether the back door is presently fully closed, fully open, or partially open. In some implementations, the autonomous device 120 may use a combination of on-board sensor data and/or external data (e.g., data collected by the sensors 132) to determine a present status associated with dynamic objects.

After obtaining the dynamic object data 206, the autonomous device 120 then generates the dynamic multi-dimensional spatial representation 204b. As described throughout, the dynamic multi-dimensional spatial representation 204b identifies the locations of detected dynamic objects within the static multi-dimensional spatial map, and includes a set of associated object information in table 210.

In the example illustrated, the dynamic multi-dimensional spatial representation 204b identifies dynamic objects A, B, C, D, and E corresponding respectively to a front door, an appliance, a den window, a bedroom window, and a bathroom door (closet and bedroom doors in this example are omitted for simplicity). The table 210 specifies a detected object type and an object status for each object that is identified in the dynamic multi-dimensional spatial representation 204b. For example, the present status of object A is "CLOSED" because the front door of the property 302 is determined to be closed when the representation 204b is generated. In another example, the present status of the object C is "OPEN—40%" based the den window being detected to be approximately half-way open. In addition, the present status of the object E is "OPEN—74°" because the bathroom door is partially open and is detected to form a 74° angle relative to the doorframe on the left wall of the bathroom.

Referring now to step (4), the autonomous device 120 generates the dynamic multi-dimensional representation 204c based on obtaining and/or collecting asset data 208. The dynamic multi-dimensional representation 203c can either be generated based on adjusting the spatial representation 204b (e.g., by inserting virtual graphical overlays onto locations of assets within the indoor environment of the property 201) or rendering a new spatial map with embedded asset information.

The asset data 208 may indicate information associated with the asset (e.g., an asset identifier, an asset type, etc.) or a present status associated with assets that are located within an indoor environment of the property 201. For example, the asset data 208 may either identify physical objects that the autonomous device 120 has automatically detected as an asset (e.g., based on using object recognition and/or detection techniques while performing the initial registration) or physical objects that a user has identified as an asset (e.g., based on sending a photo of the object or some other type of identifying information of the object).

As described above with respect to the dynamic object data 206, the asset data 208 can be obtained based on data collected by on-board sensors of the autonomous device 120 during any of steps (1), (2), and (3). For example, the autonomous device 120 can include a camera that uses object detection and recognition techniques to automatically identify locations, configurations, positions, or conditions of physical objects with high monetary value (e.g., paintings, jewelry, personal electronics) or objects that are likely to have sentimental value for a user of the property 201 (e.g., family pictures, antiques objects). In such implementations, the camera of the autonomous device 120 may be capable of using identifying assets that are within its field of view.

Additionally, or alternatively, in some implementations, the asset data 208 is obtained by the autonomous device 120 based on data collected by external sensors within the property 201 such as the sensors 132. For instance, data collected by sensors that are dynamically placed throughout the property can be obtained in order to enable the autonomous device 120 to identify the location of an asset within the spatial map 204a or infer a present status of identified asset, or both. For example, the autonomous device 120 may determine a wall of the property from which a painting is hung. In other instances, data associated with the assets may be collected from one or more of the control unit 110, the user device 140, and/or the application server 150. For example, a user may register an asset with a mobile application that runs on the user device 140 (e.g., by submitting identifying information and a photograph of the asset within the property), and the registration information may be transmitted and stored on one or more of the control unit 110 and/or the application server 150. In such examples, the registration information can then be used by the autonomous device 120 to automatically recognize the asset while navigating through the indoor environment of the property 201.

After obtaining the asset data 208, the autonomous device 120 then generates the updated dynamic multi-dimensional spatial representation 204c. As described throughout, the updated dynamic multi-dimensional spatial representation 20c indicates structures of the property 201 as identified in the spatial map 204, and the locations of detected dynamic objects included within the multi-dimensional spatial representation 204b, and the locations of detected assets. The updated multi-dimensional spatial representation 204c may be associated with asset information in table 212.

In the example illustrated, the updated dynamic multi-dimensional spatial representation 204c identifies assets F and G corresponding respectively to a painting that is hung in a wall of the den, and a camera that is sitting on a window sill of the bedroom. The table 212 specifies a detected asset type and an expected asset status for each asset that is identified in the updated dynamic multi-dimensional spatial representation 204c. For example, the asset type of asset F is "DETECTED VARIABLE" because this asset was automatically detected to be an asset by the autonomous device 120 while performing the initial registration (based on using object detection techniques). Alternatively, the asset type of asset G is "USER-ADDED" because this asset was manually added by the user as an asset to monitor within the property 201. In addition, the expected status for the asset F is a verified location of the asset within the property 201, whereas the expected status for the asset G is information related to the usage of the asset F. As this example demonstrates, the asset status can be used to enable the autonomous device 120 to monitor and/or track different types of detected information based on the type of asset involved. In addition, as described through, an expected status indicated by the asset data 208 can be compared with a present status to determine if the status of an asset has changed.

In some implementations, the expected status indicated within the table 212 may be dynamically adjusted over time to represent verified changes to the asset status for a particular asset. For example, if a user intentionally changes the position of an asset, the autonomous device 120 may detect the status change and transmit a request to the user to verify that the change was authorized by the user. In response to receiving data indicating that the change was valid, the expected status in the table 212 may be adjusted to update the verified placement, configuration, location, condition, or structure of the asset.

The illustrated examples of the dynamic multi-dimensional spatial representations 204b, 204c in the figure represents one technique to map spatial information associated with dynamic objects and/or the assets within an indoor environment with detected status information of the dynamic objects and/or the assets. In other implementations, other types of rendering techniques can additionally or alternatively be used to enable the autonomous device 120 to more efficiently navigate through the property premises, or detect, monitor, or track status changes for the dynamic objects and/or assets.

For instance, in some implementations, an area on a fixed surface of the property that corresponds to a dynamic object (e.g., a size of a door on a wall) or an asset can be represented with a virtual element such as a graphical overlay that is superimposed on a fixed spatial mapping such as the map 204a of the property 302. In such implementations, object status information and/or asset status information can be used to selectively enable or disable the display of virtual elements to control either navigation of the autonomous device 120 or actions to be performed in response to a detected change in the asset status and/or the dynamic object status. For example, if present status information indicates that a door is sufficiently open to permit passage of the autonomous device 120, then a virtual element corresponding to the door is inserted into the dynamic multi-dimensional spatial representation 204b to indicate to the autonomous device 120 that it may travel along navigational routes that require passage through the door. In this example, the virtual element may be removed from the representation 204b in real time if the door is detected to have closed to create an obstruction for the autonomous device 120.

Alternatively, in other examples, a virtual element can be inserted into the spatial map if, for example, the present status indicates that a dynamic object presents an obstruction to the autonomous device 120 while traveling on a particular navigational route. In such examples, a door pathway may be represented in the static multi-dimensional spatial map as an opening corresponding to the size of the door. When a present status of the door indicates that it is closed, a virtual element may be superimposed on the opening in the multi-dimensional spatial map in order to prevent the autonomous device 120 from considering the door pathway a suitable navigational path.

FIG. 3 illustrates an example of a process 300 for performing a particular action based on detecting a status change for an asset. The process 300 can include obtaining data indicating a dynamic multi-dimensional spatial representation of a property (310), determining a present status for an asset (320), determining that the present status for the asset does not coincide with an expected status for the asset (330), and performing a particular action based on determining that the present status does not coincide with the expected status for the asset (340).

The process 300 may be performed by one or more of the components of the system 100. For example, in some implementations, and as described below for simplicity, the process 300 is fully performed by the autonomous device 120. In such implementations, the autonomous device 120 may generate the spatial map 204a, the dynamic multi-dimensional spatial representation 204b, and the updated dynamic multi-dimensional spatial representation 204c as illustrated in FIG. 2. Alternatively, or in addition, in other implementations, the autonomous device 120 may partially perform certain steps of process 300 and one or more of the control unit 110, the user device 140, or the application server 150 may perform other steps of the process 300. For example, the autonomous device 120 may gather sensor data indicating spatial information for the property 201, and the control unit 110, the user device 140, and/or the application server 150 may obtain data collected by the autonomous device 120, process the obtained data, and generate one or more of the static map 204a, the dynamic multi-dimensional spatial representation 204b, and the dynamic multi-dimensional spatial representation 204c. In some implementations, the various components of the system 100 may perform specific steps of the process 300 to minimize monitoring latency, maximize resource allocation associated with performing the steps of the process 300, among other types of design requirements.

The process 300 may either be performed automatically (e.g., during a periodic routine operation), or based on a transmitted instruction from a user (e.g., the user 102 through the user device 140) or a component of the system 100 (e.g., the control unit 110, the application server 150, or a combination thereof). For example, the autonomous device 120 may periodically perform one or more steps of the process 300 the property while performing a routine periodic surveillance operation of the property 201. In other examples, the autonomous device 120 may perform one or more steps of the process 300 in response to specified system action (e.g., arming the system 100 once the user 102 leaves the property 101), or based on a manual request by the user 102 to perform a specified action (e.g., checking the status of a dynamic object and/or an asset).

In more detail, the process 300 can include obtaining data indicating a dynamic multi-dimensional spatial representation of a property (310). For instance, the autonomous device 120 may obtain data indicating the dynamic multi-dimensional spatial representation 204c. The dynamic multi-dimensional spatial representation (e.g., the dynamic multi-dimensional spatial representation 204c) identifies one or more dynamic objects (e.g., dynamic objects A-E) that are located within an indoor environment of a property (e.g., the property 201), and a present status for each of the one or more dynamic objects (e.g., a present status for each of the dynamic objects A-E as indicated in table 210). As described above, the present status can indicate, for example, the configuration, placement, location, and/or operation of a dynamic object and how this information can potentially impact navigation of the autonomous device 120 through the indoor environment of the property 101.

The dynamic multi-dimensional spatial representation 204c also identifies one or more assets (e.g., assets F and G) that are located within the indoor environment of the property 201, and a present status for each of the one or more assets (e.g., a present status for each of the assets F and G as indicated in table 212). As described above, the present status can indicate, for example, the configuration, placement, location, and/or operation of an asset how this information can potentially indicate whether an asset has been modified or removed.

In some implementations, the autonomous device 120 may determine a present status for the one or more dynamic to improve the navigation of the autonomous device 120 through the indoor environment of the property 201. For instance, as illustrated in FIG. 2, the dynamic multi-dimensional spatial representations 204b, 204c identify the locations of the dynamic objects within three-dimensional map of the property and includes associated information relating to the configuration, placement, and/or position of each dynamic object that is identified within the dynamic multi-dimensional spatial representation of the property 101. For example, for a door that is detected to be open, the present status can indicate a degree to which the door is open and the minimum degree that allows for the autonomous device 120 to pass through its opening. The autonomous device 120 can then use the present status of the dynamic objects to identify a navigational route to a designated location within the property 201 and/or adjust a to remaining pathway to travel on a selected navigational route (e.g., dynamic route adjustment).

As described above, in some implementations, the autonomous device 120 may perform step 310 in response to obtaining an instruction to perform a particular action associated with the property 201. The user 102 using the user device 140 can transmit the instruction. In some instances, when the user 102 is located within the property 101, the instructions can be in the form of a voice query and/or gesture directed towards the autonomous device 120. In other instances, when the user 102 is remote from the property 101, the instructions may instead be transmitted through the application server 150 and/or the control unit 110.

The instructions may identify, for example, an object of interest within the property 201 and an action to be performed by the autonomous device 120 in relation to the object of interest. For instance, an instruction may specify that the autonomous device 120 check the status and/or condition of an asset (e.g., a painting on a wall) while the user 102 is away from the property 201. In such examples, the instructions can be used to remotely instruct the autonomous device 120 to perform a surveillance operation. In other examples, the instructions may be transmitted automatically by the system 100 to perform a routine operation that is periodically performed by the autonomous device 120 (e.g., generating a dynamic multi-dimensional spatial representation of an indoor environment of the property 101). In some implementations, the dynamic multi-dimensional spatial representation 204c of the property 101 may be generated prior to receiving the instruction in step 310. In other implementations, the dynamic multi-dimensional spatial representation may instead be generated in real-time as the autonomous device 120 processes the received instruction.

In some implementations, the autonomous device 120 may compute a navigational route to perform the particular action based on the present status of the dynamic objects that are identified by the dynamic multi-dimensional spatial representation of the property 101. For example, the autonomous device 120 may determine a destination location associated with the particular action, and determine alternative navigational routes to reach the destination location from its current location. The autonomous device 120 may then identify dynamic objects that are within a certain proximity to each alternative route. The autonomous device 120 may then use the status information for each nearby dynamic object to determine an impact on its ability to travel along the navigation route. For example, if a present status of a door indicates that it is closed, then an alternative navigational route that requires the autonomous device 120 to pass through the door may be determined to be obstructed based on the inability of the autonomous device 120 to pass through the closed door.

In some implementations, the autonomous device 120 may additionally, or alternatively, use the techniques described above to perform navigational route adjustment in real time as the autonomous device 120 travels along a selected navigational route. In such implementations, the autonomous device 120 after receiving an instruction to perform a particular action, the autonomous device 120 may initially select an initial route to travel to a destination point associated with the particular action. The autonomous device 120 may then monitor dynamic objects that are identified by a dynamic multi-dimensional spatial representation in real time as the autonomous device 120 travels along the selected route. In response to detecting a change in the present status of a particular object nearby the selected route, the autonomous device 120 may then determine if the change in status presents an obstruction to travel, and if it does, determine an alternative route section to arrive at the destination. For example, if a door that is initially open when the autonomous device 120 begins traveling on the initial route closes as the autonomous device 120 travels toward a destination, the autonomous device 120 may detect the change in the status of the door, and in response, reroute its travel along the initial navigational route with an alternative navigational route.

The process 300 can include determining a present status for an asset (320). For instance, the autonomous device 120 may determine a present status for an asset based on collected sensor data associated with the asset. As described above, in some implementations, the present status can be determined based on data collected by on-board sensors of the autonomous device 120. For example, a camera of the autonomous device may capture visual data of the asset once it is within the field of view of the camera. In other implementations, the present status can be determined based on data collected by external sensors such as the sensors 132. For example, motion sensor data, temperature data, light data, among others, can be used to identify a present status of the asset.

The process 300 can include determining that the present status for the asset does not coincide with an expected status for the asset (330). For instance, the autonomous device 120 may initially compare the present status for the asset determined in step 320 with the expected status for the asset as indicated by the dynamic multi-dimensional spatial representation 204c. In some implementations, the autonomous device 120 determines that the present status for the asset does not coincide with the expected status if the present status does not match the expected status indicated by the dynamic multi-dimensional spatial representation 204c. For example, a present status may be determined to not coincide with the expected status if their respective locations within the property 201 are not identical, indicating that the asset has been moved.

Alternatively, or in addition, in other implementations, the autonomous device 120 determines that the present status for the asset does not coincide with the expected status if a detected difference between the present status and the expected status satisfies a predefined threshold level of difference. For example, a present status may be determined to not coincide with the expected status if the distance between the respective spatial coordinates indicated by the present status and the expected status satisfies a threshold difference (e.g., 100 meters).

In some implementations, the autonomous device 120 may perform other types of comparisons between the present and expected statuses (e.g., comparing a physical condition of the asset, comparing whether the asset is determined to be on/off, comparing the positioning of the asset at a specified location, etc.).

In some implementations, if the autonomous device 120 determines that the present status for the asset does coincide with the expected status of the asset, instead of proceeding to step 340, the autonomous device 120 may update information associated with the asset within an asset repository (e.g., the asset repository 152). For example, the autonomous device 120 may update a monitoring log that tracks historical statuses that were previously determined for the asset.

The process 300 can include performing a particular action based on determining that the present status does not coincide with the expected status for the asset (340). For instance, the autonomous device 120 may perform a particular action in response to determining that the present status does not coincide with the expected status of the asset.

For example, a change in asset and/or dynamic object status can be used to determine that a security breach has recently occurred within the property 201. For instance, if the autonomous device 120 is unable to find an asset at its expected location and the status of a nearby window indicates that it is broken, then the autonomous device 120 may determine that a robbery has taken place at the property 201, and in response, transmit an alert notification to the user 102 and/or the application server 150. Other exemplary actions that the autonomous device 120 can perform include triggering an alarm condition at the property 201, adjusting the operations and/or configurations of one or more components of the property 201, entering into confrontational mode to seek out an intruder, among others, or capturing audio, video, or image data of the indoor environment that surrounds an expected location of an asset.

The particular action that is performed by the autonomous device 120 can also be based on variety of factors such as the detected conditions at the property 201, the magnitude of difference between the expected status and the present status of the expected status, the type of asset or dynamic object that is determined to have a status change among others. For example, if data collected by the sensors 132 indicate an emergency condition has taken placed at the property 201, then the autonomous device 120 may perform emergency assistance techniques to guide individuals that presently occupy the property 201 to a nearby exit. In another example, if the asset that is determined to a changed status is a highly valuable asset (e.g., jewelry), then the autonomous device 120 may transmit a notification to the user 102 and/or to one or more components of the system 100. In yet another example, if the difference between the present status and the expected status is so large to suggest that, for example, the asset may have been removed from the property or that the asset may have been damaged, the autonomous device may trigger an alarm condition at the property 201.

Figure 4:
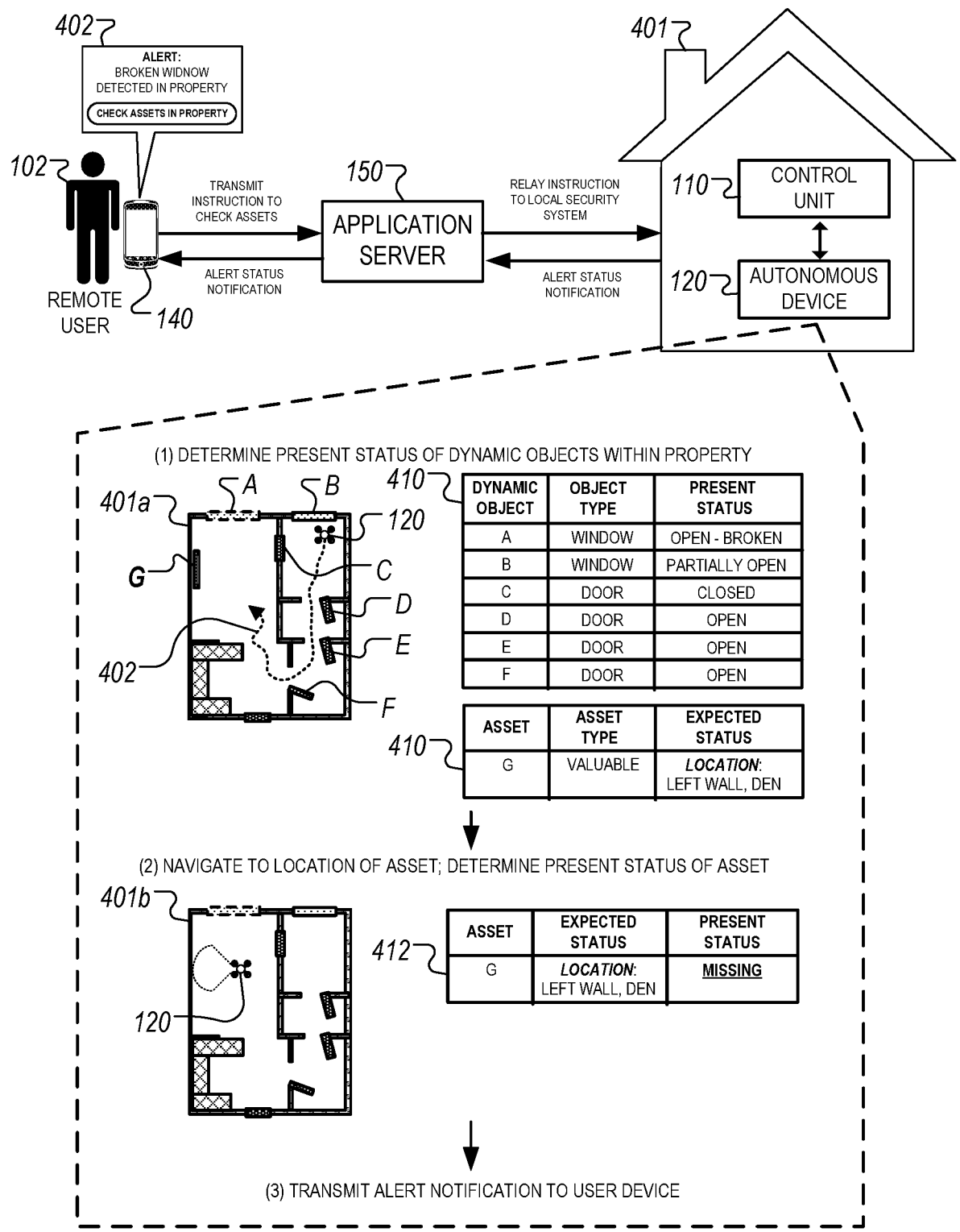
FIG. 4 illustrates and example of a technique for automatically transmitting an alert notification based on detecting a status change for an asset.

FIG. 4 illustrates and example of a technique for automatically transmitting an alert notification based on detecting a status change for an asset. In the example, the illustrated techniques are performed in response an instruction transmitted from the user 102. In other implementations, the illustrated techniques may be performed during a routine surveillance operation of the property 401. For example, as described above, the autonomous device 120 may be configured to periodically check the statuses of dynamic objects and/or assets that are located within the property 401. In other implementations, the techniques may be performed in response to a type of detected event at the property 401 (e.g., detection of an emergency condition, security breach, or any other type of aberration based on sensor data collected by the sensors 132).

In addition, the descriptions below indicate that the illustrated technique is performed by the autonomous device 120, in some implementations, the illustrated technique can additionally or alternatively be performed by other components of the system 100. For example, the illustrated technique may be partially or fully performed by one or more of the control unit 110, the application server 150, and/or another associated server that obtains monitoring data collected by the system 100. In such implementations, the autonomous device 120 and/or the sensors 132 may collect data indicating a present status of dynamic objects that are nearby an alternative navigational route, which then relay the collected data to the control unit 110 and/or the application server 150. The control unit 110 and/or the application server 150 may then aggregate the collected data to identify and/or select a navigational route for the autonomous device 120 to travel between its current location to the destination location associated with a particular action.

In the example depicted, the user 102 initially receives an alert 402 on the user device 140 indicating that a home security system (e.g., the system 100) in the property 401 has detected a broken window. Because the user 102 is remote from the property when the window is detected to be broken, the alert 402 provides the user 102 with an option to check the present status of assets that are located within the property 401. After the user 102 submits a user input indicating an instruction to check the present status of assets, the instruction is transmitted to components of the home security system (e.g., the control unit 110 and/or the autonomous device 120) through the application server 150. In some implementations, the instruction may additionally, or alternatively, be sent directly to the control unit 110. The control unit 110 then relays the instruction to the autonomous device 120.

The autonomous device 120 generally performs the illustrated technique in three steps. At step (1), the autonomous device 120 determines a present status of dynamic objects within the property 401. At step (2), the autonomous device 120 navigates to locations of one or more assets within the property 401, and then determines a present status of each asset. At step (3), the autonomous device 120 transmits an alert notification to the user device 140 based on a detected status change to an event.

In more detail, at step (1), in response to receiving an instruction from the control unit 110, the autonomous device 120 may initially survey the property to determine the status of dynamic objects in a manner similar to performing the initial registration as described above in FIG. 2. For instance, the autonomous device 120 may generate a dynamic multi-dimensional spatial representation 401a that identifies the locations of dynamic objects A-F. The autonomous device 120 then determines the statuses for the dynamic objects A-F, which are then shown in table 409. In the example, the dynamic object A is verified to be broken as initially determined by the system 100 prior to transmitting the alert 402.

The autonomous device 120 additionally obtains asset data 410 associated with an asset that is indicated within the user instruction. In the example, the user instruction specifies that the autonomous device 120 checks the status of an asset G. The asset data 410 provides asset information (e.g., "ASSET TYPE") and an expected status such as a location of the asset G within the property 401. The autonomous device 120 uses the asset data 410 to determine a location within the property 401 to navigate to in order to check the present status of the asset G. The asset data indicates that the asset G is supposed to be located on the left wall of the den of the property 401 as shown in the dynamic multi-dimensional spatial representation 401a.

At step (2), the autonomous device 120 then navigates to a location of the asset G based on the location indicated by the expected status. As described above, the autonomous device 120 may navigate through the property 401 based on determining a navigational route using the present statuses of the dynamic objects A-F that are identified within the dynamic multi-dimensional spatial representation 401a. In the example, although the fastest navigational route from the initial position of the autonomous device 120 and the expected location of the asset G is through the dynamic object C, the autonomous device 120 instead navigates to the expected location of the asset G through the dynamic objects D, E, and F. In this example, the navigational route to the expected location of the asset G is selected based on the dynamic object C being determined to be presently closed while the dynamic objects D, E, and F being determined to be presently open.

Once the autonomous device 120 reaches the expected location of the asset G, the autonomous device 120 then determines a present status for the asset G using techniques described above. For example, the autonomous device 120 may use object recognition and/or detection techniques to determine whether the asset is located in the expected location indicated by the asset data 410. In other implementations, the autonomous device 120 may use other types of status determination techniques (e.g., detecting the position, condition, configuration, or structure of the asset).

In the example depicted, the autonomous device 120 is unable to identify the asset G at the expected location, and in response, determines that the present status of the asset G is "MISSING." In some implementations, once the autonomous device 120 is unable to identify the asset G at its expected location, the autonomous device 120 may attempt to survey the indoor environment of the property 401 to determine if the autonomous device 120 has been moved to another location within the property 401. The autonomous device 120 then updates the status information for the asset G in asset data 412 to reflect the present status in relation to the expected status.

At step (3), the autonomous device 120 then performs a particular action based on the detected discrepancy between the present status and the expected status of the asset G. In the example depicted, the autonomous device transmits an alert notification to the user device 140 based on determining that the asset G has been removed from the property 401. In this example, the autonomous device 120 may determine that the asset G has been stolen based on combining the present status information of the dynamic object A indicating that it has been broken and the present status information for the asset G indicating that it is missing to determine that a burglary has recently taken place at the property 401. The transmitted alert notification is then provided in response to the instruction transmitted from the user 102.

Alternatively, or in addition, the autonomous device 120 may perform other types of actions in response to detecting discrepancies between the present status and the expected status as described above. In some implementations, the autonomous device 120 may transmit the asset data 412 to one or more components of the system 100 (e.g., the control unit 110, the application server 150), which then aggregates other type of collected sensor data (e.g., data collected by the sensors 132) to trigger an alarm condition at the property 401. For example, a present status of an asset G indicating that it is missing, a present status of the dynamic object A indicating that is broken may be aggregated with detection by a motion sensor placed in the den in order to determine that a burglar may have broken into the property 401 through the dynamic object A.

FIG. 5 illustrates an example of a system 500 that includes multiple autonomous devices 502a, 502b, and 502c for performing asset management techniques in respective regions 504a, 504b, and 504c within a property 501. As shown, each of the autonomous device may be assigned to a corresponding region of the property 501 such that it is tasked with tracking and/or monitoring the statuses of dynamic objects and/or assets that are located within the assigned region of the autonomous device. The assignments may be stored locally on the control unit 110 or remotely on the application server 150.

In the example depicted, asset management assignments 520*a*, 520*b*, and 520*c* indicate an assigned region, dynamic objects located within or nearby the assigned region, and assets located within or nearby the assigned region. The asset management assignments 520*a*, 520*b*, and 520*c* can be used to coordinate monitoring operations to be performed in respective regions of the property 501. For example, the control unit 110 may coordinate operations such that the autonomous device 502*a* monitors the status of the asset H, the autonomous device 502*b* monitors the status of asset I, and the autonomous device 502*c* monitors the status of the asset J. In this regard, the autonomous devices 502*a*, 502*b*, and 502*c* may operate within a distributed network to reduce the number of redundant monitoring operations to be performed throughout the indoor environment of the property 501.

In some implementations, the operation of the autonomous devices 502*a*, 502*b*, and 502*c* can additionally or alternatively be controlled by the user device 140, the application server 150, or a combination of different devices. In addition, the device/system that controls the operation and/or coordination of the autonomous devices 502*a*, 502*b*, and 502*c* can be adjust based on whether a user 102 is determined to reside within the property 501. For example, the user device 140 can control the autonomous devices 502*a*, 502*b*, and 502*c* when the user 102 is at home, and the control unit 110 or the application server 150 can control the autonomous devices 502*a*, 502*b*, and 502*c* when the user is remote.

FIG. 6 illustrates an example of a process 600 for monitoring the status of an asset. Briefly, the process 600 can include the operations of obtaining an indication of an asset associated with a property and monitored by an autonomous device (610), obtaining sensor data collected by one or more sensors (620), determining a present status of the asset (630), determining that the present status of the asset does not correspond to an expected status of the asset (640), and navigating to a particular location of the property in response to the determination (650).

In general, the process 600 is described below in reference to the system 100, although any property monitoring system that includes an autonomous device (e.g., the autonomous device 120) can be used to perform the operations discussed below. For example, a property management system that includes a drone device can be used to perform the operations of the process 600. In this example, the drone device can perform monitoring and surveillance operations relating to assets that are located in the property. In some implementations, the operations of the process 600 are performed by a single component of the system 100, such as the autonomous device 120. In other implementations, the operations are performed by multiple components of the system 100, such as one or more of the autonomous device 120, the control unit 110, and the application server 150. The operations of the process 600 are described as being performed by the autonomous device 120 for simplicity and clarity.

In more detail, the process 600 can include the operation of obtaining an indication of an asset associated with a property and monitored by an autonomous device (610). The autonomous device 120 can obtain an indication of an asset associated with the property 101 and monitored by the autonomous device 120. As discussed above, an asset can represent any object that a user has specified should be monitored by the autonomous device 120. The expected status of the asset identifies a condition that is monitored by the autonomous device 120, such as a location of the property 101 where the asset is expected to be located. In the example depicted in FIG. 2, the asset F is a valuable asset and its expected status identifies that the asset F is located on the left wall of the den of the property 201. In this example, the autonomous device 120 obtains the indication from the table 212.

The process 600 can include the operation of obtaining sensor data collected by one or more sensors (620). The autonomous device 120 can obtain sensor data collected by the sensors 132 located in the property 101. As discussed above, the sensor data can include temperature data, occupancy data, on motion data, activity data, among other types of sensor data characterizing an indoor environment of the property 101. For example, the sensor data can include video footage collected by a security camera of a den of the property 101. In this example, the video footage can include a wall of the den on which the asset is expected to be located. In other examples, the sensor data can include activity data associated with the region, e.g., detected activity in the region of the property 101 over the last hour before the autonomous device 120 begins monitoring the asset The process 600 can include the operation of determining a present status of the asset (630). The autonomous device 120 can determine the present status of the asset based on the sensor data. The present status can represent whether the asset is presently located in a location specified by the expected status. For example, the present status of a painting that is expected to be located in a den of the property 101 can be determined based on video footage collected by a security camera placed in the den. In other examples, the present status can represent other types of information associated with the asset, e.g., a physical condition of the asset, whether the asset has been manipulated or adjusted, a present configuration, etc.

The process 600 can include the operation of determining that the present status of the asset does not correspond to an expected status of the asset (640). The autonomous device 120 can determine that the present status for the monitored asset does not match the expected status of the asset. For example, if the expected status for a painting specifies that it should be hanging on wall of the den that is within the field view of a security camera, the autonomous device 120 can determine that the present status does not correspond to the expected status if video footage indicates that the painting is not presently hanging on the wall.

The autonomous device 120 can handle the present status not matching the expected status using different techniques. In some instances, if the asset is one of multiple assets that are being monitored by the autonomous device 120, then the present status of the asset can be temporarily set to "UNKNOWN" while the autonomous device 120 continues to determine the present statuses for the other assets that are being monitored. Once the present status of all assets are determined by the autonomous device 120, the autonomous device 120 can then further investigate the location of the asset (e.g., by navigating to the location specified by the expected status of the asset).

In other instances, the autonomous device 120 instead pauses the monitoring of the other assets once it determines that the present status of the asset does not match the expected status of the asset. In such instances, if the autonomous device 120 is configured to perform a predetermined set of actions during each monitoring operation, the autonomous device 120 can change its configuration to further investigate the asset that is determined to have a present status that does not match the expected status prior to continuing to perform the other actions. For example, the autonomous device 120 can stop monitoring the other assets and instead perform additional operations relating to the present status of the asset (e.g., searching the property 101 to identify the asset, providing an alert notification to the user device 140, triggering an alarm condition, etc.).

The process 600 can include the operation of navigating to a particular location of the property in response to determining that the present status of the asset does not correspond to an expected status of the asset (650). If the sensor data obtained by the sensors 132 indicates that the asset is not located in the particular location, the autonomous device 120 can navigate to the particular location to further investigate. For example, if video footage captured by a stationary security camera indicates that a painting is no longer hanging on a wall of the den, then the autonomous device 120 can travel to the den to confirm whether the painting is actually missing. Because the autonomous device 120 can navigate around the property 101, it can confirm whether the asset is actually missing or if has been moved by a user to another location. For instance, if the painting has been moved by a user to a wall of the den that is outside the field of view of the security camera, then the drone device can confirm that the painting is still located in the den but on a different wall that is not within the field of view of the stationary camera.

In some implementations, the process 600 can include additional operations, such as collecting one or more images of the particular location of the property after step 650. For example, the autonomous device 120 can collect images of the location specified by the present status for the asset discussed above. The images can be collected by on-board cameras of the autonomous device 120. In such implementations, the autonomous device 120 can confirm that the asset is not located at the particular location of the property based on the collected images. For instance, the autonomous device 120 can use different image processing and/or object recognition techniques to determine whether the collected images include an object corresponding to the monitored asset. The autonomous device 120 can detect identification attributes (e.g., shape, color, texture, unique symbols, identifiers, etc.) of objects identified in the images. The autonomous device 120 can then compare the identification attributes of the objects to known identification attributes of the monitored asset to determine if the monitored asset is represented in the collected images. If the monitored asset is identified as being represented in the collected images, then the autonomous device 120 determines that the monitored asset is located at the particular location where the images were collected. Alternatively, if the monitored asset is unable to be identified the collected images, the autonomous device 120 can determine that the monitored asset is not presently located in the particular location.

In some implementations, after determining that the present status of the monitored asset does not match the expected status in step 640, the autonomous device 120 may perform additional operations to locate the asset. The autonomous device 120 can identify a previous status of the asset that indicates another location of the property where the asset was previously determined to be located. For example, the present status of a book can indicate that it is expected to be located in the living room. If the autonomous device 120 determines that the book is not located in the living room, then it can access data collected during a monitoring operation performed two days ago when the book was determined to be located in the kitchen. In this example, the autonomous device 120 can navigate to the kitchen and collect one or more images of the kitchen to determine if the book is located in the kitchen.

In implementations, the autonomous device 120 identifies the previous status of a monitored asset based on accessing a historical status within the repository 152. As discussed above, the repository 152 can be stored locally on the autonomous device 120, stored on the control unit 110, or stored remotely on the application server 150. In some instances, the control unit 110 and/or the autonomous device 120 locally stores a portion of the repository 152 (e.g., monitoring system data collected in the last two weeks). The repository identifies previous monitoring operations performed by the autonomous device 120, and a previous status determined for the asset during each previously performed monitoring operation. For example, if the autonomous device 120 performs the monitoring operation for an asset on a daily basis, then the repository can identify a location of the asset for each day of the previous week. In some instances, where the autonomous device 120 determines that the asset is not presently located in the location specified by the expected status, the autonomous device 120 identifies the most recent prior location of the asset based on identifying a most recently performed monitoring operation and identifying a status associated with that operation that identifies the most recent prior location. For example, if a book is not presently located in the kitchen (e.g., a location specified by the expected status), the autonomous device 120 can determine to navigate to the living room (e.g., the location specified by the status determined during the most recent prior location).

In some implementations, the autonomous device 120 can perform additional operations after navigating to a location of the property that is associated with a prior status. For instance, the autonomous device 120 can collect images at the location in a manner similar as described above for collecting images at the location that is associated with the expected status. If the autonomous device 120 is unable to identify the asset at the location associated with the prior status, the autonomous device 120 may perform a specified action. For example, the autonomous device 120 can provide a communication to the user device 140 indicating that the asset may be missing because it is not located in the location associated with the expected status or the prior status from the most recent monitoring operation. In other examples, the autonomous device 120 can continue to identify other locations of the property where the asset may be located based on other prior statuses specified in the repository 152. In some other examples, the autonomous device 120 can perform operations relating to the system 100, such as triggering an alarm condition at the property 101, determining a potential security breach at the property 101, surveying other assets to be monitored to determine if other assets are unable to be located, among others.

In some implementations, the expected status identifies an expected physical condition of a monitored asset in addition to, or as an alternative to, a location in the property where the monitored asset is expected to be located. For example, the expected status can identify categories representing the amount of physical damage of the asset (e.g., "NEW," "LIKE NEW," "DAMAGED"). In another example, the expected status can identify categories representing the functionality of the asset (e.g., "OPERATIONAL," "NON-OPERATIONAL"). In yet another example, the expected status can represent whether the asset has been manipulated, modified, or adjusted since the last monitoring operation (e.g., "UNCHANGED," "MODIFIED"). In these examples, the autonomous device 120 can collect images of the asset during each monitoring operation and use image processing techniques to determine a present physical condition of the asset that is compared against an expected physical condition of the property. For instance, the autonomous device 120 can use a damage model to identify different types of damage to an asset (e.g., surface scratches, surface imperfections, etc.). In another instance, the autonomous device 120 may evaluate the positioning or placement of the asset relative to prior status data to determine if it has been tampered or modified without authorization from the user 102.

In some implementations, the autonomous device 120 can obtain images collected by a security camera of the property to validate determinations made relating to a physical condition of a monitored asset. For example, if the autonomous device 120 determines that the asset has been tampered with, the autonomous device 120 may obtain video or image data of the region of the property where the asset is located to determine if a user that previously occupied the region actually tampered with the asset. In this example, the autonomous device 120 confirms a status confirmation (e.g., present status matching expected status) using the video or image data collected by the security camera.

In some implementations, one or more of the operations of the process 600 can be performed by the control unit 110 based on image data collected by the autonomous device 120. For example, the control unit 110 can obtain the indication of the asset at step 610, obtain sensor data collected by the sensors 132 at step 620, determine a present status of the asset at step 630, and determine that the present status of the asset does not correspond to the expected status of the asset at step 640. In this example, the control unit 110 can transmit an instruction to the autonomous device 120 to navigate to a location of the property associated with the expected status at step 650. In such implementations, the control unit 110 can process and/or analyze images collected by the autonomous device 120 at different locations of the property to determine if the asset is missing, has been modified, and/or has been manipulated in reference to status information. For example, the control unit 110 can determine a location of the asset within the property 101 based on using object detection and/or recognition techniques to identify the presence of the asset in an image of the location collected by the autonomous device 120. As another example, the control unit 110 can adjust a status of the system 100 based on data collected by the autonomous device 120 during a monitoring operation. In this example, if the autonomous device 120 is unable to locate the asset within the property 101, the control unit 110 can trigger an alarm condition at the property 101, transmit an alert notification to the user device 140, among other types of actions. Similarly, in another implementation, the application server 150 may perform one or more operations based on image data collected by the autonomous device 120 instead of the control unit 110. For example, the application server 150 may receive image data and sensor data collected by the control unit 110, make the various determinations described in operations of process 600, and then transmit an instruction to navigate to a particular location to the control unit 110 to forward to the autonomous device 120.

In some implementations, the autonomous device 120 can adjust the monitoring operations it conducts based on sensor data collected by on-board sensors in addition to, or as an alternative to, sensor data collected by the sensors 132. The on-board sensors of the autonomous device 120 can collect image data of the property 101 as the autonomous device 120 performs a monitoring operation for assets located within the property. In some instances, the sensor data collected by the on-board sensors can be used to identify a present status of an asset irrespective of the sensor data collected by the sensors 132 while the autonomous device 120 is traveling along a predetermined path throughout the property. For example, sensor data collected by the on-board sensors while the autonomous device 120 is navigating through the predetermined path can indicate that an asset is presently located in a location that is not specified by the expected status. In this example, the autonomous device 120 adjusts its navigation so that instead of continuing along the predetermined path, it instead performs a different action, e.g., initiating a monitoring operation of all other assets in the property, transmitting a notification to the user device 140, triggering an alarm condition at the property 101, etc. In this regard, sensor data collected by the on-board sensors of the autonomous device 120 can be processed in real-time to adjust the navigation of the autonomous device along its predetermined navigation paths to improve asset monitoring. The adjustment can take place while the autonomous device 120 is performing an ongoing monitoring operation, or alternatively, while the autonomous device 120 is performing other routine operations, e.g., checking the status of dynamic objects that are not assets, performing a user-directed query to perform a specified action, etc.

In some implementations, the autonomous device 120 can use a present status of an asset to adjust the execution of a monitoring operation that involves monitoring multiple assets. For example, the autonomous device 120 can be configured to navigate to three locations of the property that each correspond to locations of three assets as referenced by their expected statuses. Using the techniques discussed above, the autonomous device 120 determines, based on the sensor data collected by the sensors 132, that one of the three assets is not presently located at the expected location. In this example, the autonomous device 120 does not navigate to the expected location of the asset since the sensor data indicates that the asset is not presently located there, but instead navigates to other locations of the property 101 where the asset may be located (e.g., prior locations identified by prior statuses of the asset, etc.). In this example, the sensor data collected by the sensors 132 is used by the autonomous device 120 to prevent extraneous navigation within the property 101 that may, for instance, consume battery power to perform, take additional time to perform, or not improve the likelihood of identifying the actual location of the asset within the property 101.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   determining, by an autonomous device, that a present status of an asset within a property that is being monitored by the autonomous device does not correspond to an expected status of the asset,
   based on determining that the present status does not correspond to the expected status, determining, by the autonomous device, a previous status of the asset that identifies a location of the property where the asset was previously determined to be located;
   navigating, by the autonomous device, to the location of the property; and
   collecting, by the autonomous device, one or more images of the location of the property.

2. The method of claim 1, wherein:
   the expected status identifies a first location of the property where the asset is expected to be located;
   the present status identifies a second location of the property where the asset is identified to be presently located based on sensor data collected by one or more sensors of the property; and
   determining that the present status does not correspond to the expected status comprises determining that the first location is different from the second location.

3. The method of claim 1, wherein determining the previous status of the asset comprises:
   accessing a historical status repository identifying (i) previous monitoring operations performed by the autonomous device in the property, and (ii) a respective previous status determined for the asset during each previously performed monitoring operation; and
   based on accessing the historical status repository:
      identifying a most recently performed monitoring operation within the historical status repository, and
      identifying a previous status of the asset that was determined during the most recently performed monitoring operation.

4. The method of claim 1, further comprising:
   determining, by the autonomous device and based on the one or more images, that the asset is not presently located at the location; and
   based on determining that the asset is not presently located at the location, providing, by the autonomous device for output to a computing device of a user associated with the property, a communication indicating that the asset is not located at the location of the property.

5. The method of claim 1, wherein:
   the expected status identifies an expected physical condition of the asset; and
   the method further comprises:
      obtaining one or more images collected by a security camera of the property, wherein the one or more images indicate a present physical condition of the asset, and
      determining that the present status indicates the present physical condition of the asset; and
   determining that the present status does not correspond to the expected status comprises determining that the present physical condition does not match the expected physical condition.

6. The method of claim 5, wherein determining that the present physical condition does not match the expected physical condition comprises determining that the one or more images collected by the security camera indicates that the asset is damaged.

7. The method of claim 1, further comprising:
   obtaining, by the autonomous device, data indicating a security breach at the property; and
   determining that the present status does not correspond to the expected status of the asset comprises that determining that the present status does not correspond to the expected status of the asset in response to obtaining the data indicating the security breach.

8. A system comprising:
   one or more computing devices; and
   one or more non-transitory computer-readable storage devices storing instructions that, when executed by the one or more computing devices, cause the one or more computing devices to perform operations comprising:
      determining, by an autonomous device, that a present status of an asset within a property that is being monitored by the autonomous device does not correspond to an expected status of the asset,
      based on determining that the present status does not correspond to the expected status, determining, by the autonomous device, a previous status of the asset that identifies a location of the property where the asset was previously determined to be located;
      navigating, by the autonomous device, to the location of the property; and
      collecting, by the autonomous device, one or more images of the location of the property.

9. The system of claim 8, wherein:
   the expected status identifies a first location of the property where the asset is expected to be located;
   the present status identifies a second location of the property where the asset is identified to be presently located based on sensor data collected by one or more sensors of the property; and
   determining that the present status does not correspond to the expected status comprises determining that the first location is different from the second location.

10. The system of claim 8, wherein determining the previous status of the asset comprises:
    accessing a historical status repository identifying (i) previous monitoring operations performed by the autonomous device in the property, and (ii) a respective previous status determined for the asset during each previously performed monitoring operation; and based on accessing the historical status repository:

identifying a most recently performed monitoring operation within the historical status repository, and identifying a previous status of the asset that was determined during the most recently performed monitoring operation.

11. The system of claim 8, wherein the operations further comprise:

determining, by the autonomous device and based on the one or more images, that the asset is not presently located at the location; and based on determining that the asset is not presently located at the location, providing, by the autonomous device for output to a computing device of a user associated with the property, a communication indicating that the asset is not located at the location of the property.

12. The system of claim 8, wherein:

the expected status identifies an expected physical condition of the asset; and the operations further comprise:

obtaining one or more images collected by a security camera of the property, wherein the one or more images indicate a present physical condition of the asset, and determining that the present status indicates the present physical condition of the asset; and determining that the present status does not correspond to the expected status comprises determining that the present physical condition does not match the expected physical condition.

13. The system of claim 12, wherein determining that the present physical condition does not match the expected physical condition comprises determining that the one or more images collected by the security camera indicates that the asset is damaged.

14. The system of claim 8, wherein the operations further comprise:

obtaining, by the autonomous device, data indicating a security breach at the property; and determining that the present status does not correspond to the expected status of the asset comprises that determining that the present status does not correspond to the expected status of the asset in response to obtaining the data indicating the security breach.

15. At least one non-transitory computer-readable storage device storing instructions that, when executed by one or more computing devices, cause the one or more computing devices to perform operations comprising:

determining, by an autonomous device, that a present status of an asset within a property that is being monitored by the autonomous device does not correspond to an expected status of the asset, based on determining that the present status does not correspond to the expected status, determining, by the autonomous device, a previous status of the asset that identifies a location of the property where the asset was previously determined to be located;

navigating, by the autonomous device, to the location of the property; and collecting, by the autonomous device, one or more images of the location of the property.

16. The non-transitory computer-readable storage device of claim 15, wherein:

the expected status identifies a first location of the property where the asset is expected to be located;

the present status identifies a second location of the property where the asset is identified to be presently located based on sensor data collected by one or more sensors of the property; and determining that the present status does not correspond to the expected status comprises determining that the first location is different from the second location.

17. The non-transitory computer-readable storage device of claim 15, wherein determining the previous status of the asset comprises:

accessing a historical status repository identifying (i) previous monitoring operations performed by the autonomous device in the property, and (ii) a respective previous status determined for the asset during each previously performed monitoring operation; and based on accessing the historical status repository:

identifying a most recently performed monitoring operation within the historical status repository, and identifying a previous status of the asset that was determined during the most recently performed monitoring operation.

18. The non-transitory computer-readable storage device of claim 15, wherein the operations further comprise:

determining, by the autonomous device and based on the one or more images, that the asset is not presently located at the location; and based on determining that the asset is not presently located at the location, providing, by the autonomous device for output to a computing device of a user associated with the property, a communication indicating that the asset is not located at the location of the property.

19. The non-transitory computer-readable storage device of claim 15, wherein:

the expected status identifies an expected physical condition of the asset; and the operations further comprise:

obtaining one or more images collected by a security camera of the property, wherein the one or more images indicate a present physical condition of the asset, and determining that the present status indicates the present physical condition of the asset; and determining that the present status does not correspond to the expected status comprises determining that the present physical condition does not match the expected physical condition.

20. The non-transitory computer-readable storage device of claim 19, wherein determining that the present physical condition does not match the expected physical condition comprises determining that the one or more images collected by the security camera indicates that the asset is damaged.

* * * * *